United States Patent
Subramanian et al.

(10) Patent No.: US 10,862,802 B1
(45) Date of Patent: Dec. 8, 2020

(54) SYSTEMS AND METHODS FOR FRAME LOOKUP AND FORWARDING IN A NETWORK

(71) Applicant: Xilinx, Inc., San Jose, CA (US)

(72) Inventors: Ramesh R. Subramanian, Hyderabad (IN); Ashif Khan Mohammed, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 71 days.

(21) Appl. No.: 15/948,881

(22) Filed: Apr. 9, 2018

(51) Int. Cl.
*H04L 12/743* (2013.01)
*H04L 12/46* (2006.01)
*H04L 12/823* (2013.01)
*H04L 12/931* (2013.01)
*H04L 29/06* (2006.01)

(52) U.S. Cl.
CPC ...... *H04L 45/7457* (2013.01); *H04L 12/4633* (2013.01); *H04L 12/4645* (2013.01); *H04L 47/32* (2013.01); *H04L 49/354* (2013.01); *H04L 63/0227* (2013.01)

(58) Field of Classification Search
None
See application file for complete search history.

(56) References Cited

U.S. PATENT DOCUMENTS

| 10,284,473 | B1 * | 5/2019 | Sharma | H04L 47/125 |
| 2008/0229415 | A1 * | 9/2008 | Kapoor | G06F 21/55 726/22 |
| 2013/0114593 | A1 * | 5/2013 | Jabr | H04L 49/552 370/389 |
| 2017/0257398 | A1 * | 9/2017 | Park | H04L 63/0263 |

OTHER PUBLICATIONS

MEF Technical Specification MEF 10.3, Ethernet Services Attributes Phase 3, Oct. 2013,© The MEF Forum 2013, 120 pgs.
Markus Jochim, General Motors Research & Development, "Ingress Policing", IEEE 802.1 TSN Plenary, Nov. 10-15, 2013—Dallas—USA, 43 pages.
Stephen Haddock, "Frame Metering in 802.1Q", Version 1, Jan. 15, 2013, 20 pages, http://www.ieee802.org/1/files/public/docs2013/new-tsn-haddock-flow-metering-in-Q-0113-v01.pdf.
U.S. Appl. No. 15/837,336, filed Dec. 11, 2017, Ramesh R. Subramanian et al., San Jose, CA USA.
U.S. Appl. No. 15/837,400, filed Dec. 11, 2017, Ramesh R. Subramanian et al., San Jose, CA USA.

* cited by examiner

*Primary Examiner* — Robert M Morlan
(74) *Attorney, Agent, or Firm* — Haynes and Boone, LLP (57) ABSTRACT

A network device includes a plurality of ports, a lookup circuit, and a traffic control circuit. The lookup circuit is configured to provide a first action for a first frame to be forwarded using a first forwarding path between a first set of two ports of the plurality of ports. The lookup circuit is further configured to and provide a second action for a second frame to be forwarded using a second forwarding path between a second set of two ports of the plurality of ports. The traffic control circuit configured to forward the first frame based on the first action and forward the second frame based on the second action.

20 Claims, 9 Drawing Sheets

SYSTEMS AND METHODS FOR FRAME LOOKUP AND FORWARDING IN A NETWORK

FIELD

Examples of the present disclosure generally relate to integrated circuits (ICs) and, in particular, to an embodiment related to system and methods for frame lookup and forwarding using an IC in a network.

BACKGROUND

In a communication system, a switching device may receive streams including frames (packets) containing data or control information on one port, and based on destination information contained within the frames, routes the frames out another port to the destination (or an intermediary destination). Many applications using the communication system, such as process control applications and machine control applications may have a large number of streams. Moreover, these applications may be latency critical to meeting control loop frequency requirements.

Accordingly, it would be desirable and useful to provide an improved way for frame lookup and forwarding in a network.

SUMMARY

In some embodiments in accordance with the present disclosure, a network device includes a plurality of ports, a lookup circuit, and a traffic control circuit. The lookup circuit is configured to: provide a first action for a first frame to be forwarded using a first forwarding path between a first set of two ports of the plurality of ports; and provide a second action for a second frame to be forwarded using a second forwarding path between a second set of two ports of the plurality of ports. The traffic control circuit configured to: forward the first frame based on the first action; and forward the second frame based on the second action.

In some embodiments, the plurality of ports include a first network port, a second network port, and an internal endpoint port.

In some embodiments, the first forwarding path is between one of the first and second network ports and the internal endpoint port, and the second forward path is between the first network port and the second network port.

In some embodiments, the first action includes a translation action for translating a stream identification of the first frame.

In some embodiments, the translation action is associated with a destination media access control (MAC) address field of the first frame.

In some embodiments, the translation action is associated with a virtual LAN (VLAN) identifier (ID) field of the first frame.

In some embodiments, a stream identification of the second frame remains the same when the second frame is forwarded using the second forwarding path.

In some embodiments, the first forwarding path is from the internal endpoint port, and the first action includes a stream split action.

In some embodiments, the first forwarding path is to the internal endpoint port, and the first action includes at least one of a stream merge action and a sequence recovery action.

In some embodiments, the second action includes an individual recovery action.

In some embodiments, the lookup circuit includes a content addressable memory (CAM) and a lookup unit coupled to the CAM. The lookup unit is configured to: generate a lookup key based on a received frame; and provide a lookup value using the CAM based on the lookup key. The lookup value includes one of the first and second actions.

In some embodiments, the traffic control circuit is configured to: perform a frame replication and elimination for reliability (FRER) unit configured to perform a FRER process for a received frame.

In some embodiments in accordance with the present disclosure, a method includes receiving, by a network device having a plurality of ports, a first frame and a second frame; providing a first action for the first frame to be forwarded using a first forwarding path between a first set of two ports of the plurality of ports; providing a second action for the second frame to be forwarded using a second forwarding path between a second set of two ports of the plurality of ports; forwarding the first frame based on the first action; and forwarding the second frame based on the second action.

Other aspects and features will be evident from reading the following detailed description and accompanying drawings.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. Time-sensitive Ethernet frames (e.g., defined by IEEE standards) are typically pre-negotiated for identification mechanism, network paths, bandwidth, fault tolerance and recovery mechanisms. These frames are periodically sent over network, and are also referred as streams. For real time communication of time sensitive streams (e.g., in industrial control applications, digital video and audio data) over the networks, network devices (e.g., switches, bridges, etc.) implement low latency, non-blocking, and highly deterministic frame forwarding mechanisms. To enable deterministic real-time communication over Ethernet, Time-Sensitive Networking (TSN) standards have been defined by the IEEE TSN task group. The TSN standards define network components (e.g., switches, bridges) and endpoint components (e.g., talkers, listeners, etc.) to be part of a time aware system. Such a time aware system may also be referred to as a TSN system. A typical TSN system may include switches and endpoints as separate components. In such a typical TSN system, the lookup and forwarding requirements are different for the switching components and endpoint components. Further, best effort traffic may be allowed to be converged over the TSN system, which have different lookup and forwarding requirements from the traffic having a scheduled priority or reserved priority of the TSN system.

For integrated circuit (IC) solutions, it has been discovered that an IC that integrates network components (e.g., a switch) and endpoint components (e.g., a talker, a listener) may be used in a time aware network system (e.g., a TSN system). By using an integrated lookup and forwarding action determination system, network component requirements (e.g., TSN switching) and endpoint component requirements (e.g., talker and listener requirements) may be satisfied.

Various advantages may be present in various applications of the present disclosure. No particular advantage is required for all embodiments, and different embodiments may offer different advantages. One of the advantages of some embodiments is that by providing an integrated solution of a switch and an endpoint, lower latency is achieved by eliminating latency of a network node to an internal endpoint. Another advantage of some embodiments is that by providing an integrated lookup and forwarding action determination engine, switching component (e.g., TSN switching) and endpoint component (e.g., talker, listener) requirements are integrated, which provides better flexibility without compromising on any of system level flexibilities. For example, the frame lookup and forwarding action determination may be performed using an integrated content addressable memory (CAM) structure, which may provide different sets of actions for a frame based on that frame's forwarding path. For further example, actions may be provided based on traffic types associated that frame. Such an integrated lookup and forwarding engine may provide the needed hardware accelerations, and also allow the system to have the flexibility to manage (e.g., using software) the IC as a switch and also as an endpoint. Yet another advantage of some embodiments is that such an integrated lookup and forwarding action determination system may satisfy different lookup and forwarding requirements for traffic having different priorities (e.g., best effort, reserved, scheduled). Yet another advantage of some embodiments is that the best effort traffic may utilize source MAC address and VLAN ID based hardware address learning functions. Such hardware address learning functions allow hardware logic to configure CAM for frame forwarding decisions (e.g., based on the port on which a particular MAC Address and VLAN ID was learned). The hardware address learning function may only be applied on network ports of a switch, where the internal endpoint port of the switch is treated as an edge port and does not require hardware address learning. In some examples, by maintaining unique VLAN IDs, hardware address learning may be selectively disabled for schedule and reserved traffic.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
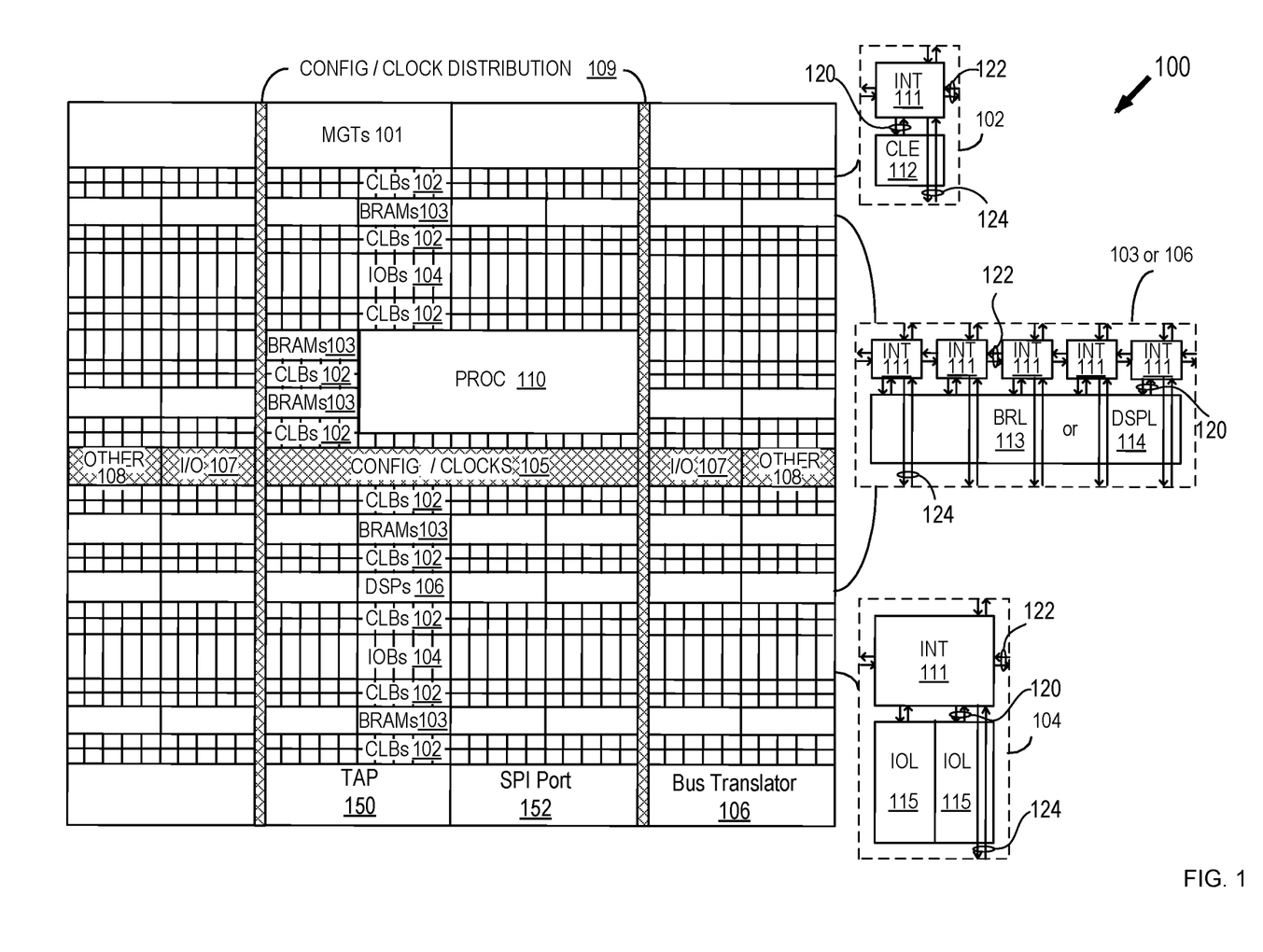
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the one or more embodiments described herein is not limited to the exemplary IC depicted in FIG. 1, and that IC having other configurations, or other types of IC, may also implement those embodiments.

Figure 2:
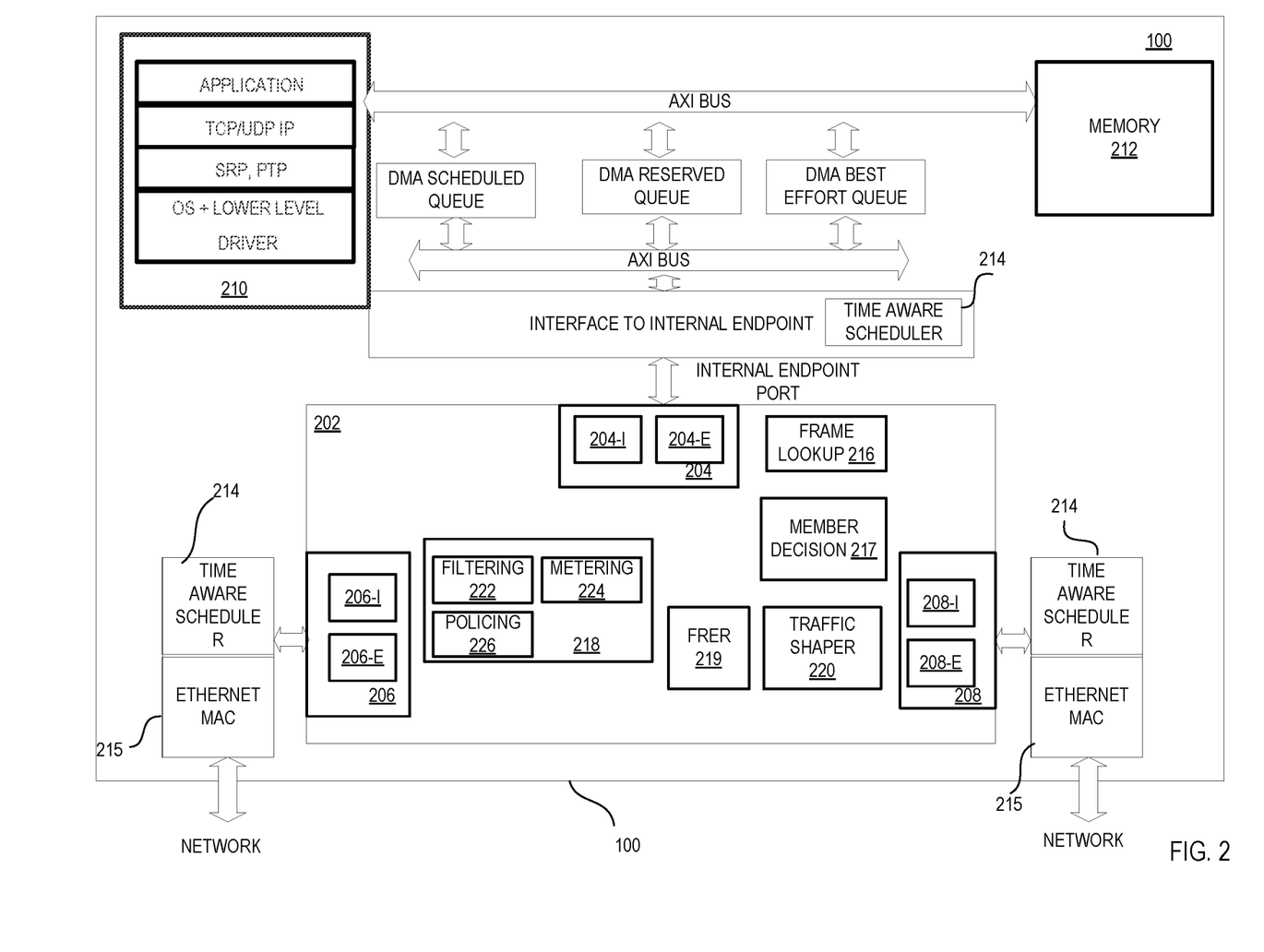
FIG. 2 is a block diagram illustrating an exemplary switch according to some embodiments of the present disclosure.

Referring to FIG. 2, illustrated is an IC 100 including a switch 202. The switch 202 includes three ports 204, 206, and 208. The port 204 connects to a processing unit 210 and a memory 212 through internal buses. As such, the port 204 is also referred to as an internal endpoint port 204. The ports 206 and 208 are connected to an external network through a network interface (e.g., an Ethernet media access control (MAC) interface 215). As such, ports 206 and 208 are also referred to as network ports 206 and 208. Each of the ports 204, 206, and 208 includes an ingress port (e.g., ingress ports 204-I, 206-I, 208-I) and an egress port (e.g., 204-E, 206-E, and 208-E).

In some embodiments, the switch 202 supports queues having different priorities (e.g., a scheduled priority, a reserved priority, a best effort priority). For example, a scheduled queue (e.g., including control data) may have a scheduled priority, which indicates that the frames in the scheduled queue are time critical, and have a priority higher than other priorities. For further example, a reserved queue (e.g., including audio/video data) may have a reserved priority, indicating that the frames in the reserved queue have a lower priority than the scheduled priority. For further example, a best effort queue may have a best effort priority, which indicates that the frames in that best effort queue are not time critical, and have a lower priority than the reserved priority.

In the example of FIG. 2, the switch 202 includes a frame lookup unit 216, a member decision unit 217, a traffic policer 218, a FRER unit 219, and a traffic shaper 220. The frame lookup unit 216 may look up values (e.g., translations, actions) associated with a particular frame. The member decision unit 217 may determine member decisions including actions associated with a sequence including multiple member streams for sequence recovery. The traffic policer 218 includes a filtering unit 222, a metering unit 224, and a policing unit 226. The filtering unit 222 may perform filtering using various filtering rules on a per stream basis, and output a filtering decision (e.g., allowing, dropping, or blocking). The filtering unit 222 may then send streams that comply with its filtering rules to the metering unit 224. The metering unit 224 may perform a metering function based on bandwidth profiles, and provide metering decisions (e.g., marking including red, yellow, green) for each frame. The policing unit 226 may then police the network traffic by performing various actions (e.g., allowing, dropping, marking) to the frames based on the filtering decisions and metering decisions. The FRER unit 219 may perform a per stream frame replication and elimination function to avoid frame loss due to equipment failure. The FRER unit 219 may control the network traffic by performing various actions based on the frame lookup values from the frame lookup unit 216, filtering decisions, member decisions, and/or a combination thereof, and may also be referred to as a traffic control circuit 219. The traffic shaper 220 may perform queuing functions and transmission functions, and forward the selected frames to the corresponding egress ports.

As illustrated in FIG. 2, time aware schedulers 214 are implemented on egress paths of the switch 202. The egress paths may include an egress path using the egress port 206-E, and an egress path using the egress port 208-E. The time aware schedulers 214 may block the non-scheduled queues, so that the corresponding port is idle when the scheduled queue is scheduled for transmission. While in the example of FIG. 2, an egress path including an egress port 204-E of the internal endpoint port 204 does not include a time aware scheduler 214, in other examples, the egress path including an egress port 204-E may also include a time aware scheduler 214.

Figure 3A:
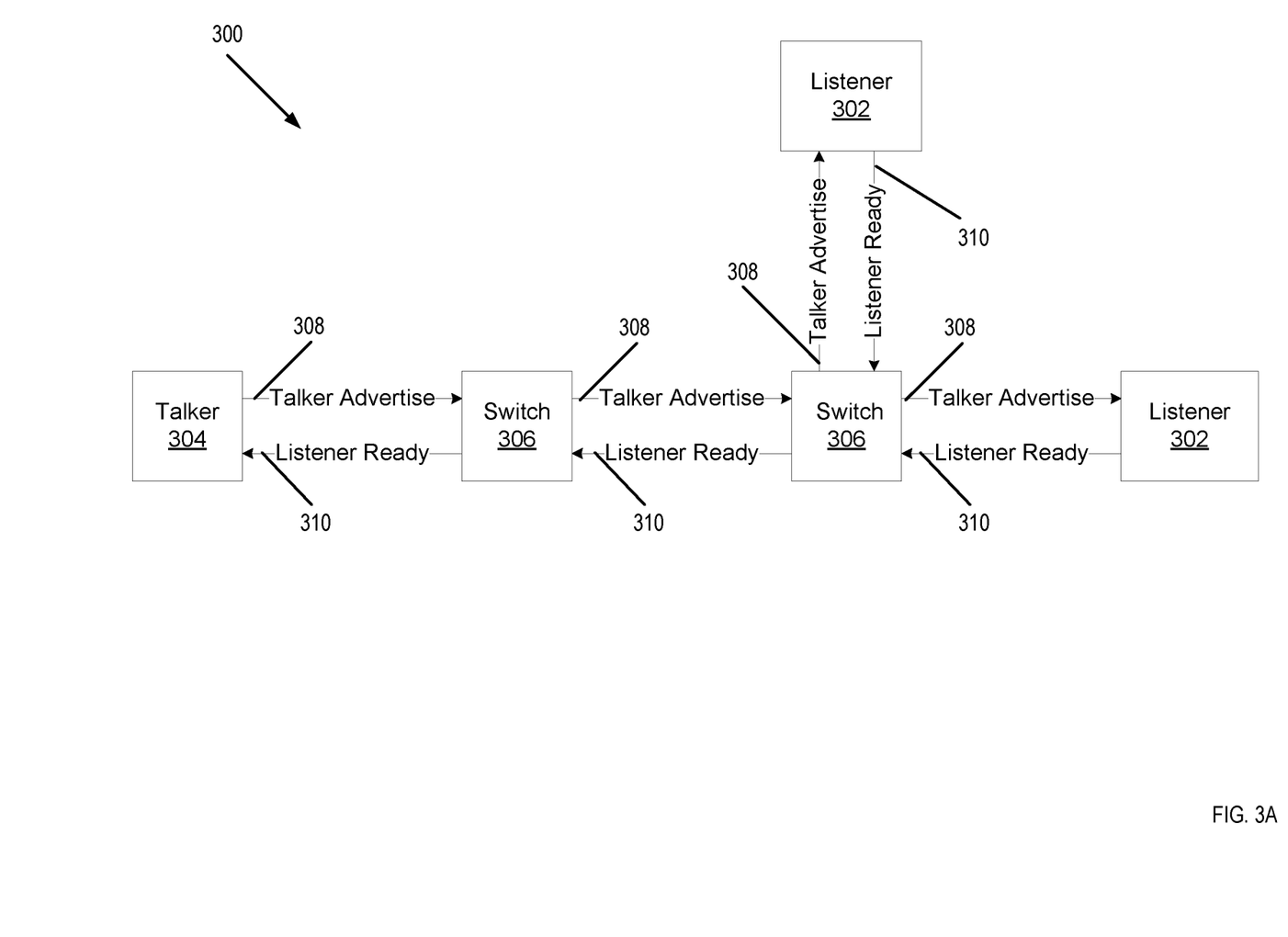
FIG. 3A is a block diagram illustrating a registered stream communicated in a network based on a control protocol according to some embodiments of the present disclosure.

Referring to FIG. 3A, dynamic control protocols may be used for building paths through a network for rank-based, latency guaranteed bandwidth reservations. In the example of FIG. 3A, an exemplary dynamic control protocol, Stream Registration Protocol (SRP) defined by IEEE 802.1Q standard, is illustrated. The SRP may include different types of SRPs including, for example, Multiple MAC Registration Protocol (MMRP), Multiple VLAN Registration Protocol (MPRP), and Multiple Stream Registration Protocol (MSRP). In the example of FIG. 3A, a network 300 includes one or more listeners 302, one or more talkers 304, and one or more switches 306. In some embodiments, a talker 304 is a source of a stream, and a listener 302 is a destination for the stream. A talker 304 may advertise a stream with a registration message 308. A talker 304 may have one or more listeners 302. The registration message 308 may be forwarded to network components (e.g., a switch 306) and listeners (e.g., a listener 302). In response to receiving the registration message 308, a network component (e.g., switch 306) checks for available resources, acknowledges the registration message 308, and forwards the registration message 308 to the next network component (e.g., a switch 306) or endpoint component (e.g., a listener 302). In examples where all the network components and endpoint components of the network 300 have the necessary resources to support the stream, the stream is registered, where one or more listeners are attached to the stream. A listener 302 may provide a listener ready message 310, which may be forwarded to a talker (e.g., a talker 304) by network components (e.g., a switch 306). A registered stream may then be sent over a network with particular parameters (e.g., data frame parameters including, for example, a destination MAC address, a VLAN ID) as the registered stream is communicated using the SRP.

Figure 3B:
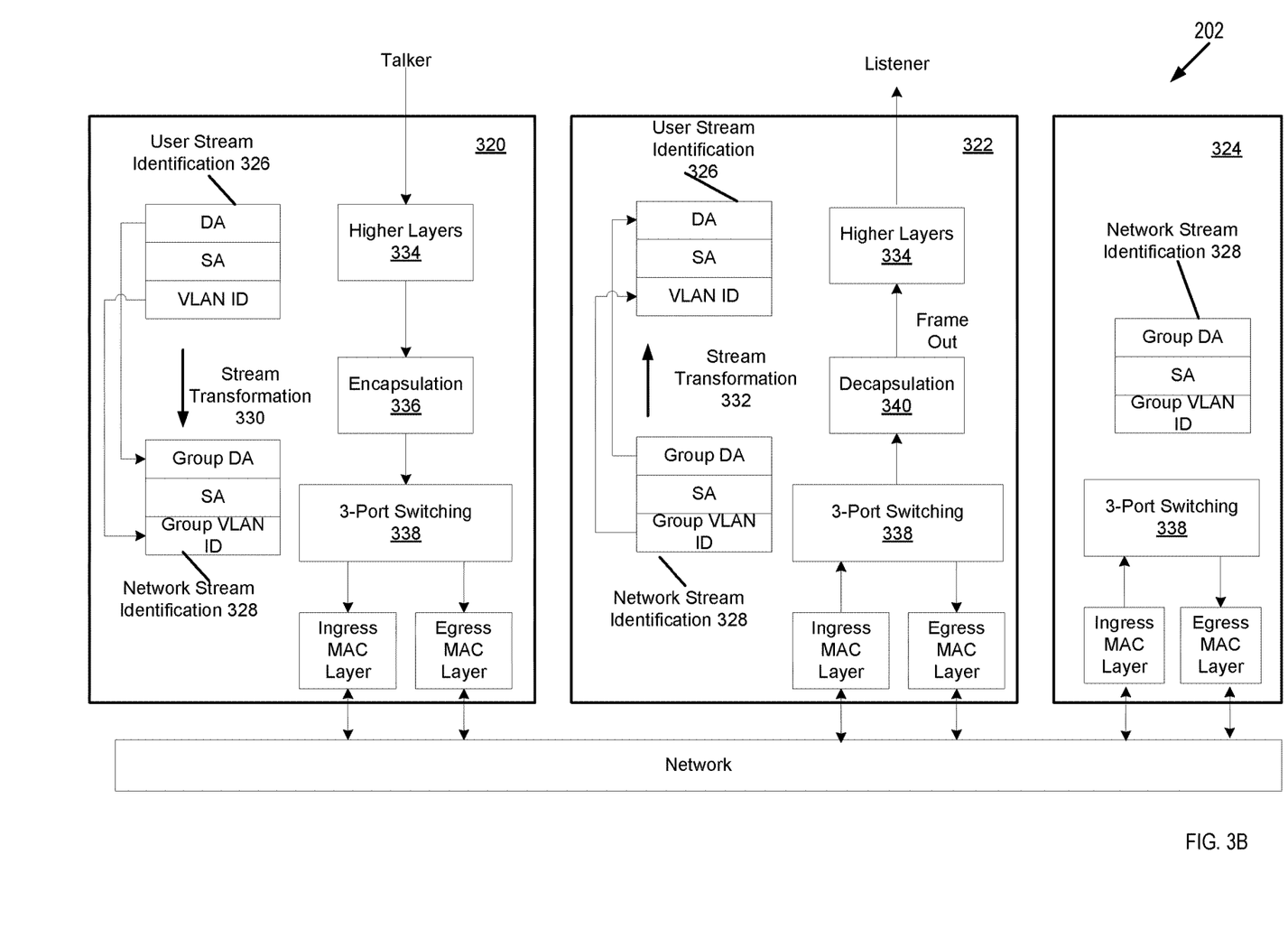
FIG. 3B is a block diagram illustrating forwarding paths of a registered stream of FIG. 3A in a switch of FIG. 2 according to some embodiments of the present disclosure.

Referring to FIG. 3B, various forwarding paths of streams (e.g., registered streams of FIG. 3A) in a switch (e.g., switch 202 of FIG. 2) are illustrated. In some embodiments, a forwarding path (e.g., forwarding path 320 or 322) includes stream transformation (e.g., between user stream identification and network stream identification with destination MAC address translation and/or VLAN ID translation). For example, as shown in forwarding paths 320 and 322, a stream is forwarded between a network port (e.g., network ports 206, 208 of FIG. 2) and an internal endpoint port (e.g., internal endpoint port 204 associated with a listener or a talker) of a switch 202. In those examples, stream transformation between user stream identification and network stream identification is performed. The stream transformation may include destination MAC address translation and VLAN ID translation. In some embodiments, a forwarding path (e.g., forwarding path 324) does not include stream transformation. For example, as shown in forwarding path 324, a stream is forwarded between network ports (e.g., network ports 206, 208 of FIG. 2). In those examples, the stream includes the same stream identification (e.g., network stream identification) during the forwarding path, and no stream transformation is performed during the forwarding path 324.

As shown in the example of FIG. 3B, a switch 202 (e.g., switch 202 of FIG. 2) implements forwarding paths 320, 322, and 324. The forwarding path 320 forwards a stream from an internal talker (e.g., internal endpoint port 204) to a network port (e.g., network ports 206, 208). In the forwarding path 320, a higher layer unit 334 may provide user stream identification 326 of a stream from a talker to an encapsulation layer unit 336. The user stream identification 326 may include a unicast MAC address (including e.g., a destination address (DA) and a source address (SA)) and a VLAN ID associated with the stream. The encapsulation layer unit 336 performs stream transformation to translate the user stream identification 326 to network stream identification 328 of the stream. For example, encapsulation layer unit 336 converts the unicast MAC address of user stream identification 326 to a multicast address or a group MAC address (including e.g., a group DA) of network stream identification 328. For further example, encapsulation layer unit 336 converts VLAN ID of user stream identification 326 to group VLAN ID of network stream identification 328. The stream is forwarded to the network based on the network stream identification 328, by a three-port switching unit 338 using an egress network port (e.g., 206-E, 208-E).

In the example of FIG. 3B, the forwarding path 322 forwards a stream from a network port (e.g., network ports 206, 208) to an internal listener (e.g., internal endpoint port 204). Decapsulation layer unit 340 receives a stream from the network, through the three-port switching unit 338, and performs stream transformation to translate network stream identification 328 of the stream to user stream identification 326. For example, decapsulation layer unit 340 converts a group MAC address (including e.g., a group DA) of network stream identification 328 to a unicast MAC address of user stream identification 326. For further example, decapsulation layer unit 340 converts group VLAN ID of network stream identification 328 to VLAN ID of user stream identification 326. The stream is forwarded to the listener (e.g., internal endpoint port 204) based on the user stream identification 326. As such, the encapsulation and decapsulation functions (e.g., performed by the encapsulation layer unit 336 and decapsulation layer unit 340 respectively) may be coupled with the higher layer unit 334 (e.g., using an IP stream identification function).

As illustrated in FIG. 3B, the forwarding path 324 does not include stream transformation. The forwarding path 324 forwards a stream between network ports, for example, from network port 206 to network port 208 or vice versa. As such, in those examples, after a stream is registered using SRP (e.g., with data frame parameters) as discussed above with reference to FIG. 3A, the stream may be forwarded to from one network port to another network port using the network stream identification 328 without any stream transformation.

Figure 4:
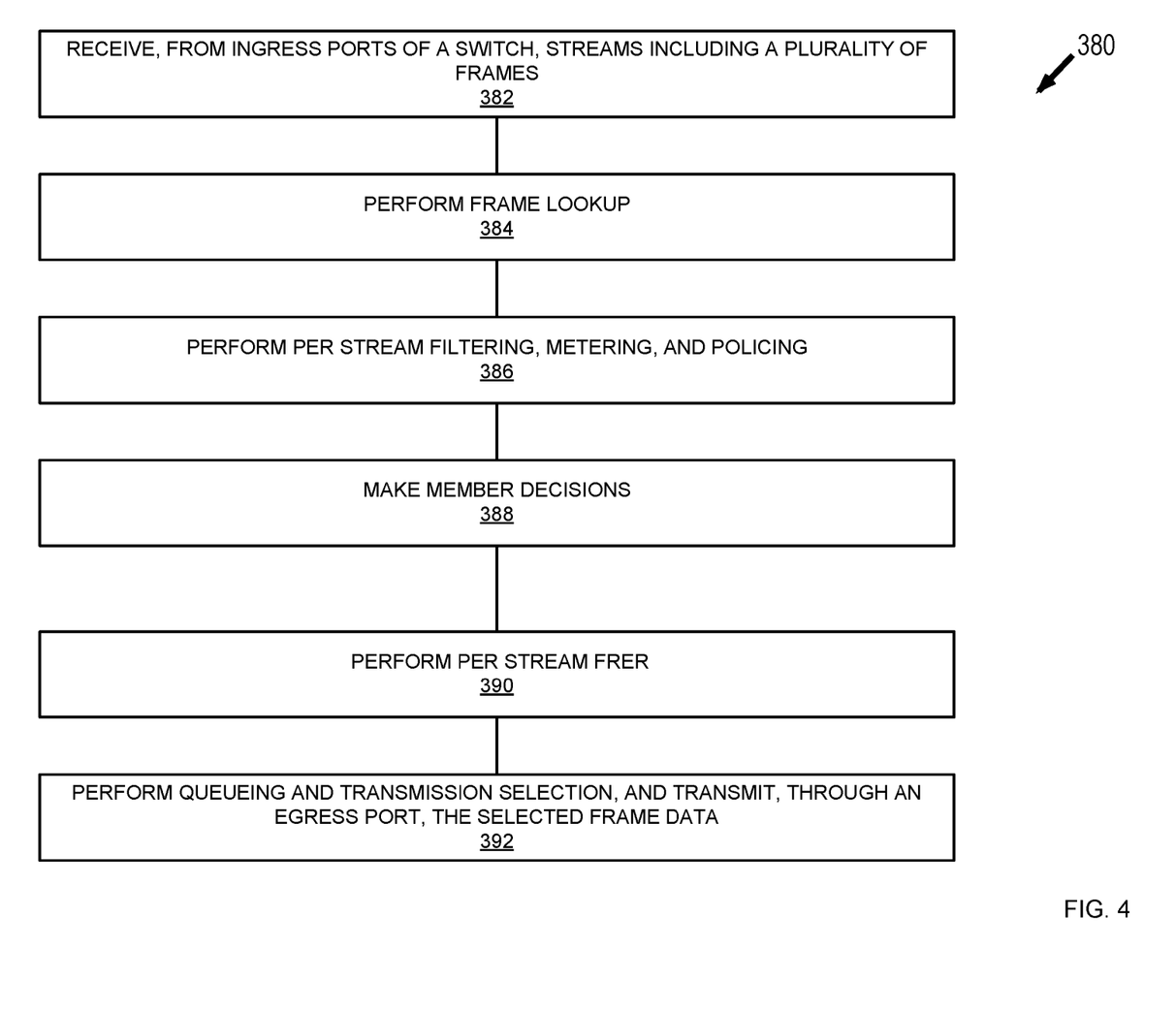
FIG. 4 is a flow diagram illustrating a method for integrated frame lookup and forwarding according to some embodiments of the present disclosure.

Referring to FIG. 4, illustrated thereof is a method 380 of forwarding frames using integrated frame lookup and forwarding by a switch (e.g., a switch 202 of FIG. 2). The method 380 begins at block 382, where a switch receives, from an ingress port (reception port) of the switch, a stream including a sequence of frames. For example, at block 382, one or more ingress ports (e.g., ingress ports 204-I, 206-I, and 208-I) of the switch 202 of FIG. 2 receive streams where each stream includes a sequence of frames.

The method 380 may then proceed to block 384, where the switch performs a frame lookup process to provide various lookup values (e.g., translations, actions) associated with the frames.

Figure 5:
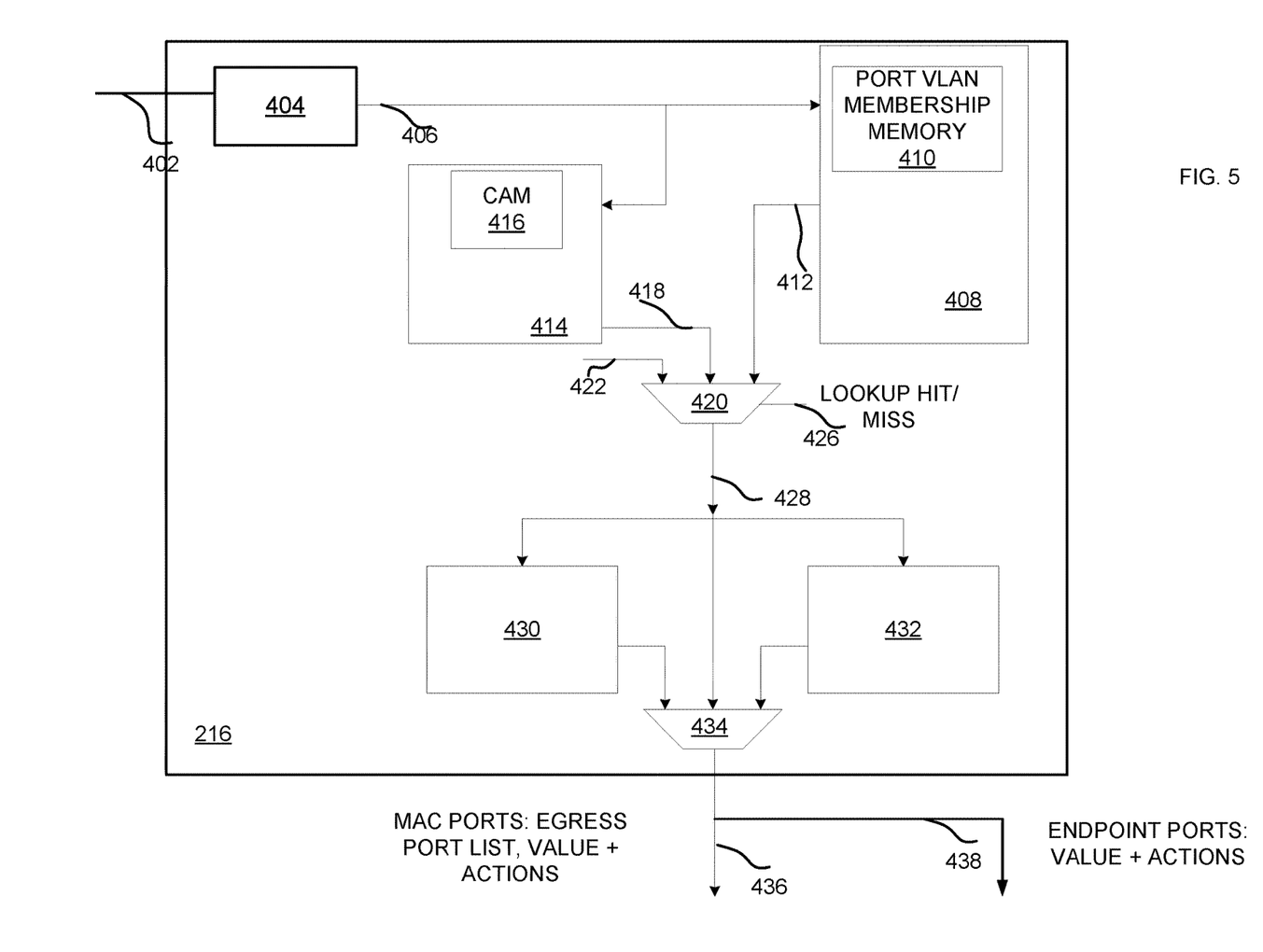
FIG. 5 is a block diagram illustrating a frame lookup unit provided in a switch according to some embodiments of the present disclosure.
Figure 6A:
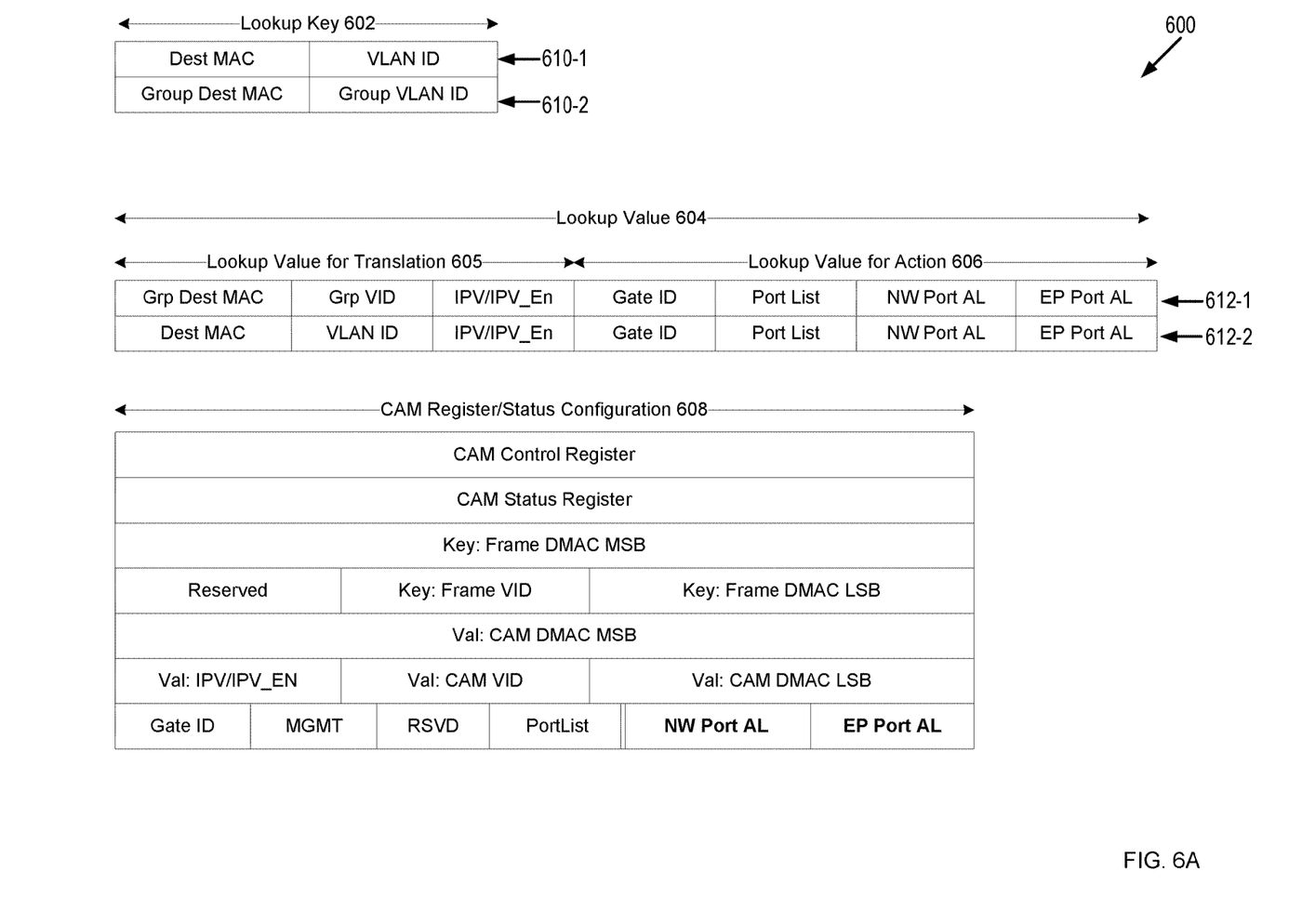
FIG. 6A is a block diagram illustrating a content addressable memory (CAM) structure according to some embodiments of the present disclosure.
Figure 6B:
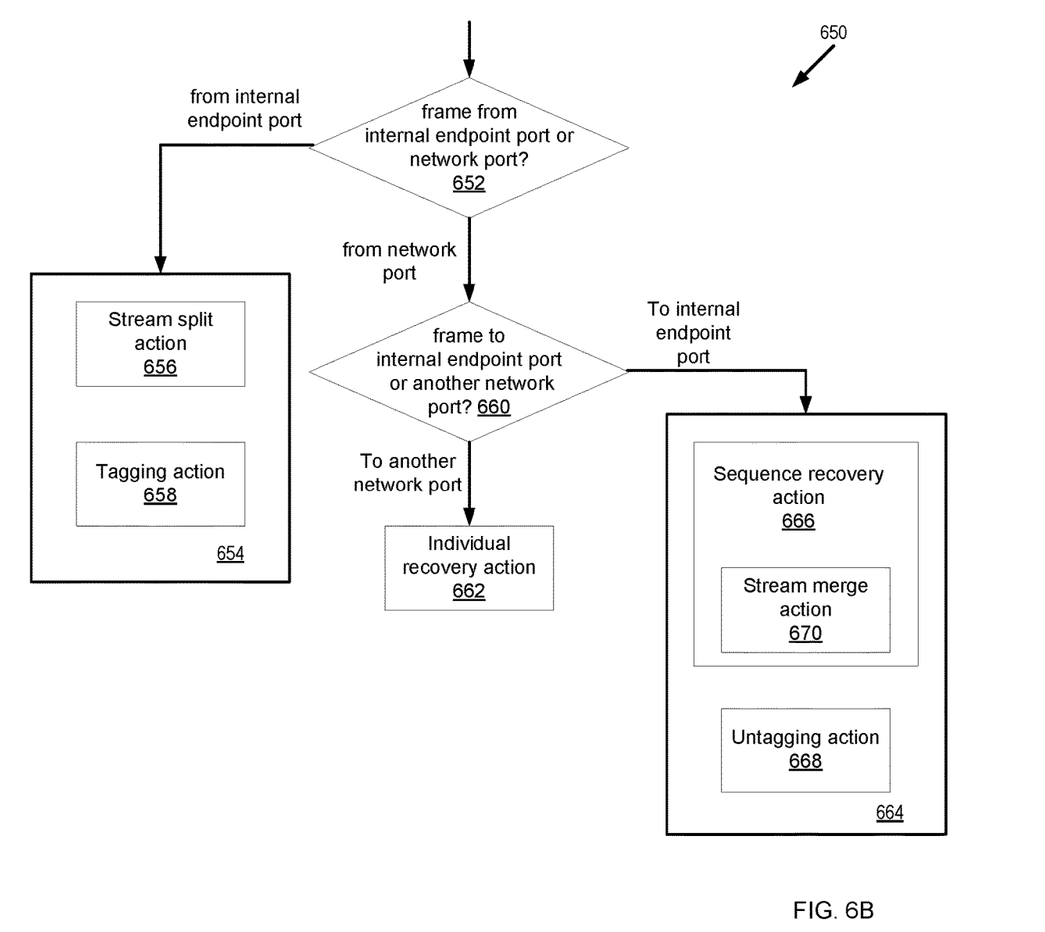
FIG. 6B is a flowchart illustrating a method for providing lookup values for actions using the CAM structure of FIG. 6A according to some embodiments of the present disclosure.

Referring to the examples of FIGS. 5, 6A, and 6B, at block 384, a frame lookup unit 216 of a switch 202 of FIG. 2 performs a lookup process for the received frames to determine values (e.g., egress ports, egress priority queue, translations, actions, etc.) associated with the frames. FIG. 5 illustrates the lookup levels supported in a switch 202. FIG. 6A illustrates a memory structure (e.g., CAM structure) for a memory (e.g., CAM 416) used in the lookup process. FIG. 6B illustrates an action determination process to determine different sets of actions using the CAM structure based on a frame's forwarding path in the switch.

Referring to FIG. 5, at block 384, the frame lookup unit 216 receives a frame 402 of an incoming stream, and sends the frame 402 to a parsing unit 404. The parsing unit 404 may parse the header fields (e.g., destination MAC address, VLAN identifier (ID), priority fields) of the frame 402, and output the parsed frame information 406 including, for example, the destination MAC address, VLAN ID, and priority associated with the frame 402.

In the example of FIG. 5, the frame lookup unit 216 may perform the frame lookup process using multiple memories (e.g., a port VLAN membership memory 410 and a content addressable memory (CAM) 416). For example, the frame lookup unit 216 includes a VLAN membership lookup unit 408, which looks up VLAN member ports using a port VLAN membership memory 410 based on the parsed frame information 406 (e.g., by using the VLAN ID of the parsed frame information 406). The VLAN membership lookup unit 408 may then output the VLAN member ports 412 associated with the frame 402.

In some embodiments, the frame lookup unit 216 may include a content addressable memory (CAM) lookup unit 414. In some embodiments, the CAM lookup unit 414 looks up translations and/or actions associated with the frame 402 using a CAM 416 based on the parsed frame information 406 (e.g., a destination MAC address, VLAN ID, and/or a combination thereof). The actions may include a translation action, a tagging/un-tagging action, an individual recovery action, a sequence recovery action, any other suitable action, and/or combination thereof.

In some embodiments, the CAM lookup unit 414 may look up a gate ID for a particular frame by using the corresponding parsed frame information 406 as the CAM lookup keys. That gate ID may be used in subsequent per-stream filtering, policing, and frame replication and elimination functions, which will be described in detail below. The CAM lookup unit 414 then provides a CAM output 418, which may include translations, actions, and gate ID associated with the frame 402.

Referring to the example of FIG. 6A, illustrated is a CAM structure 600 of the CAM (e.g., CAM 416 of FIG. 5) for storing lookup values (e.g., translations, actions) on incoming frames. The CAM structure 600 includes lookup key structure 602, lookup value structure 604, and CAM register configuration structure 608.

As shown in FIG. 6A, the lookup key structure 602 includes lookup keys 610-1 and 610-2. The lookup key 610-1 includes a destination MAC address and a VLAN ID (e.g., associated with a frame received from the internal endpoint port 204). The lookup key 610-2 includes a group destination MAC address and a group VLAN ID (e.g., associated with a frame received from network ports 206, 208). In an example, the received frame is a tagged frame. In that example, the VLAN ID for the lookup key of the received frame is the same as the VLAN ID in the received frame. In another example, the received frame is an untagged frame. In that example, the VLAN ID for the lookup key of the received frame is configured to be a native VLAN ID (e.g., with a default value of 12'h001).

The lookup value structure 604 includes lookup value for translation structure 605 and lookup value for action structure 606. The lookup value structure 604 includes separate sets of actions for frames having different forwarding paths (e.g., forwarding paths 320, 322, and 324) in the switch 202, which allows an integrated frame lookup and forwarding system for the switch 202. Using a lookup key (e.g., lookup keys 610-1 and 610-2), CAM lookup unit 414 looks up the lookup value (e.g., lookup values 612-1, 612-2) of the lookup value structure 604. Each of the lookup value may include a lookup value for translation (e.g., with a lookup value for translation structure 605) and a lookup value for action (e.g., with a lookup value for action structure 606).

In some embodiments, the lookup value for translation (e.g., of the lookup value 612-1 or 612-2) has a lookup value for translation structure 605, which includes fields for value for translation including for example, destination MAC address/group destination MAC address and VLAN ID/group VLAN ID. The lookup value for translation may be is used for translation for a particular frame when it is determined that a translation action is associated with that particular frame. In an example, it is determined that actions for a particular frame include a destination MAC Address translation action. In that example, that particular frame may be updated (e.g., by the encapsulation layer unit 336 and/or decapsulation layer unit 340 of FIG. 3B) to include the destination MAC address/group destination MAC address of the lookup value (e.g., in its stream identification). In another example, it is determined that actions for a tagged frame include a VLAN ID translation action. In that example, that tagged frame may be updated (e.g., by the encapsulation layer unit 336 and/or decapsulation layer unit 340 of FIG. 3B) to include the VLAN ID/group VLAN ID of the lookup value (e.g., in the tagged frame's stream identification). In yet another example, it is determined that actions for an untagged frame include a tagging action. In that example, the untagged frame may be updated to include the VLAN ID/group VLAN ID of the lookup value (e.g., in the untagged frame's stream identification).

In some embodiments, the lookup value for translation structure 605 includes fields including an internal priority value (IPV) enabled (IPV_EN) field. In an example where the frame is a tagged frame and the IPV field includes a value (e.g., 1) indicating that IPV is enabled, the egress priority queue for that frame is IPV instead of a queue corresponding to the frame priority. In another example, the frame priority is compared against IPV value, and in response to a match, the frame may be treated as belonging to the translation structures. In that example, the IPV_EN field of the lookup value for translation structure 605 is not used.

In some embodiments, the lookup value for action has a lookup value for action structure 606 with fields including, for example, gate ID, port list, network (NW) port action list (AL), and endpoint (EP) port AL.

In some embodiments, the gate ID of the lookup value for action structure 606 is used for per stream policing (e.g., 802.1Qci based policing) and stream redundancy (e.g., 802.1CB frame redundancy) operations. The gate ID may be a unique ID (e.g., 8 bits) assigned to each stream. The gate ID may provide indexing for associated policing and redundancy configurations, and may also be used for filtering streams for any error (e.g., error based on a max frame size, error associated with ingress port identifier check) with enabling the stream for PSFP/FRER function.

In some embodiments, the port list of the lookup value for action structure 606 indicates a target port (e.g., endpoint port 204, network ports 206 and 208) of the switch 202.

In some embodiments, the network port action list of the lookup value for action structure 606 includes one or more actions associated with a frame having a target network port of the switch 202. In an example, the network port action list includes a translation action for translating the destination MAC address of the frame with the destination MAC address of the lookup value for translation structure 605. In another example, the network port action list includes a translation action for translating the VLAN ID of the frame with the VLAN ID of the lookup value for translation structure 605. In yet another example, the network port action list includes a tagging action for tagging the frame with the CAM VLAN ID and/or CAM IPV_EN from the lookup value for translation structure 605.

In the example of FIG. 6A, the content addressable memory (CAM) structure 600 also includes a CAM register/status configuration 608 providing various parameters for frame lookup and forwarding. A CAM register/status configuration 608 may include values for a particular lookup key, and the corresponding lookup values associated with that particular lookup key. In the example of FIG. 6, the lookup value of the CAM register/status configuration 608 includes a management (MGMT) field, which is used to indicate whether the frame is forwarded to an internal endpoint port on a management queue.

In some embodiments, frames forwarded on a management queue to the CPU include additional information including, for example, frame ingress port id. That additional information may be used for control frame processing for various protocols (e.g., SRP, STP, LLDP). In some embodiments, the management queue also allows control frames originating from the CPU to be sent on a particular network port. In those embodiments, MAC address associated with a switch port may be used in addition to a CAM MGMT bit. For example, when a CPU sends a frame with a source MAC address that is the same as a switch network port MAC address, the frame is sent only to the associated network port. A destination MAC address for those control frames are typically a predefined multicast address.

In some embodiments, the CAM configurations may be performed using a set of registers. The CAM control register may allow various operations (e.g., add, delete, and/or read) to the CAM 600. The CAM status register provides a completion status for an operation, thereby allowing new operations to be performed on the CAM 600. The CAM control register programming may be performed after the CAM key and value register programming. In an example, a CAM key includes a 48-bit MAC Address and a 12-bit VLAN ID. A set of actions (e.g., address translations, port list for forwarding decisions, VLAN tagging and VLAN un-tagging operations on a frame, and/or a combination thereof) may be set for a CAM Key (e.g., by programming the lookup value fields in the register). In an example, for every frame received, a CAM lookup key may include Destination MAC Address and VLAN ID received in the frame. The CAM lookup key may be searched in the CAM 600, and in response to a CAM hit, the associated actions are taken on that frame.

Referring to FIG. 6B, different sets of actions may be provided by the lookup process using the CAM structure based on a frame's forwarding path in the switch. In the example of FIG. 6B, a method 650 for providing the lookup value for action (e.g., of the NW port AL and/or EP port AL fields of the lookup value for action structure 606) is illustrated.

The method 650 begins at block 652, where it is determined, based on frame information of a received frame, whether the received frame is from an internal endpoint port or a network port of the switch 202. In some embodiments, at block 652, it is determined that the received frame is from an internal endpoint port of the switch 202. In those embodiments, the received frame is to be forwarded to a network port of the switch 202. The method 650 may then proceed to block 654, where actions including stream split action 656 and/or tagging action 658 (e.g., IEEE 802.1 CB tagging actions) are provided (e.g., using the NW port AL field of the lookup value for action structure 606 of FIG. 6A).

In some embodiments, at block 152, it is determined that the received frame is from a network port of the switch 202. In response to that determination, the method 650 may then proceed to block 660, where it is determined whether the received frame is to be forwarded to another network port or to an internal endpoint port of the switch 202.

In some embodiments, at block 660, it is determined that the received frame is to be forwarded to another network port of the switch 202. In response to that determination, the method 650 may then proceed to block 662, where actions including an individual recovery action are provided (e.g., using the NW port AL field of the lookup value for action structure 606 of FIG. 6A).

In some embodiments, at block 660, it is determined that the received frame is to be forwarded to the internal endpoint port of the switch 202. In response to that determination, the method 650 may then proceed to block 664, where actions including sequence recovery action 666 (including e.g., stream merge action 670) and/or untagging action 668 (e.g., IEEE 802.1 CB untagging action) are provided (e.g., using the EP AL field of the lookup value for action structure 606 of FIG. 6A).

By using the CAM structure 600 for an integrated frame lookup process, different sets of actions may be provided for frames having different forwarding paths in the switch 202. This provides flexibility for subsequent FRER functions executed based on the translations and actions provided by the lookup process. In other words, the CAM structure 600 allows frames/streams received on a network port of a switch 202 to be forwarded to either the internal endpoint port of the switch 202 or another network port of the switch 202, by providing different set of actions and translations for the frames based on the forwarding paths of the frames. Further, actions may be provided based on the traffic type associated with the stream. For example, stream transformation (e.g., MAC address translation) may be performed to TSN streams (e.g., scheduled streams), while best effort streams may be forwarded with any native VLAN tagging.

In some embodiments, in addition to TSN streams (e.g., streams with a scheduled or reserved priority), the switch 202 supports best effort frames with a best effort priority. The best effort frames, unlike TSN streams, may be tagged or untagged. In an example where the frame is untagged, the switch may support register configuration based forwarding or CAM lookup based on destination MAC address and native VLAN ID configured for each ingress port. In another example where the frame is tagged, that tagged frame may be searched based on the VLAN membership memory. In some embodiments, the destination MAC address for TSN streams and best effort frames are different. As such, the lookup translations and actions for TSN streams may also be applied to the best effort frames. In an example, if a destination MAC translation is needed for a best effort frame when it is forwarded from one network port to another network port of the switch 202, it can be applied through CAM programming.

Furthermore, by providing a gate ID that is unique per stream, the CAM structure 600 provides additional flexibility for per stream configurations. For example, TSN defines a unique ID for stream management. In some embodiments, the CAM structure 600 provides the gate ID as the unique ID for stream management. Different sets of actions associated with FRER functions (e.g., stream split functions, stream merge functions, individual recovery functions, tagging, untagging) may be performed for different streams based on the forwarding paths of those streams.

Referring to FIG. 5, the frame lookup unit 216 may include an output unit 420 receiving the VLAN member ports 412 from the VLAN membership lookup unit 408, receiving the CAM output 418 from the CAM lookup unit 414, and receiving switch control settings 422 (e.g., from a storage element of the switch 202). In an example, the output unit 420 may process the received VLAN member ports 412, CAM output 418, and switch control settings 422, and provide a frame lookup output 428 based on a lookup hit/miss signal 426. In an example, for each frame, the frame lookup output 428 may include an ingress port ID, VLAN member ports 412, actions, gate ID, and/or a combination thereof.

In some embodiments, additional lookups are performed for per stream traffic policer lookup unit 430 and per stream redundancy protocol lookup unit 432. For example, the per stream traffic policer lookup unit 430 receives the frame lookup output 428, and retrieves a per stream traffic policer configuration based on the frame lookup output 428. For further example, the per stream redundancy protocol lookup unit 432 may receive the frame lookup output 428, and provide a per stream redundancy protocol based on the frame lookup output 428. A lookup output unit 434 may receive the frame lookup output 428, per stream traffic policer configurations, and per stream redundancy protocol, and provide network port lookup signal 436 and internal endpoint port lookup signal 438. The network port lookup signal 436 includes egress port list, value, and actions for the frames that are to be forwarded to network ports (e.g., network ports 206, 208). The internal endpoint port lookup signal 438 includes lookup value and actions for the frames that are to be forwarded to internal endpoint (e.g., internal endpoint port 204).

Figure 7:
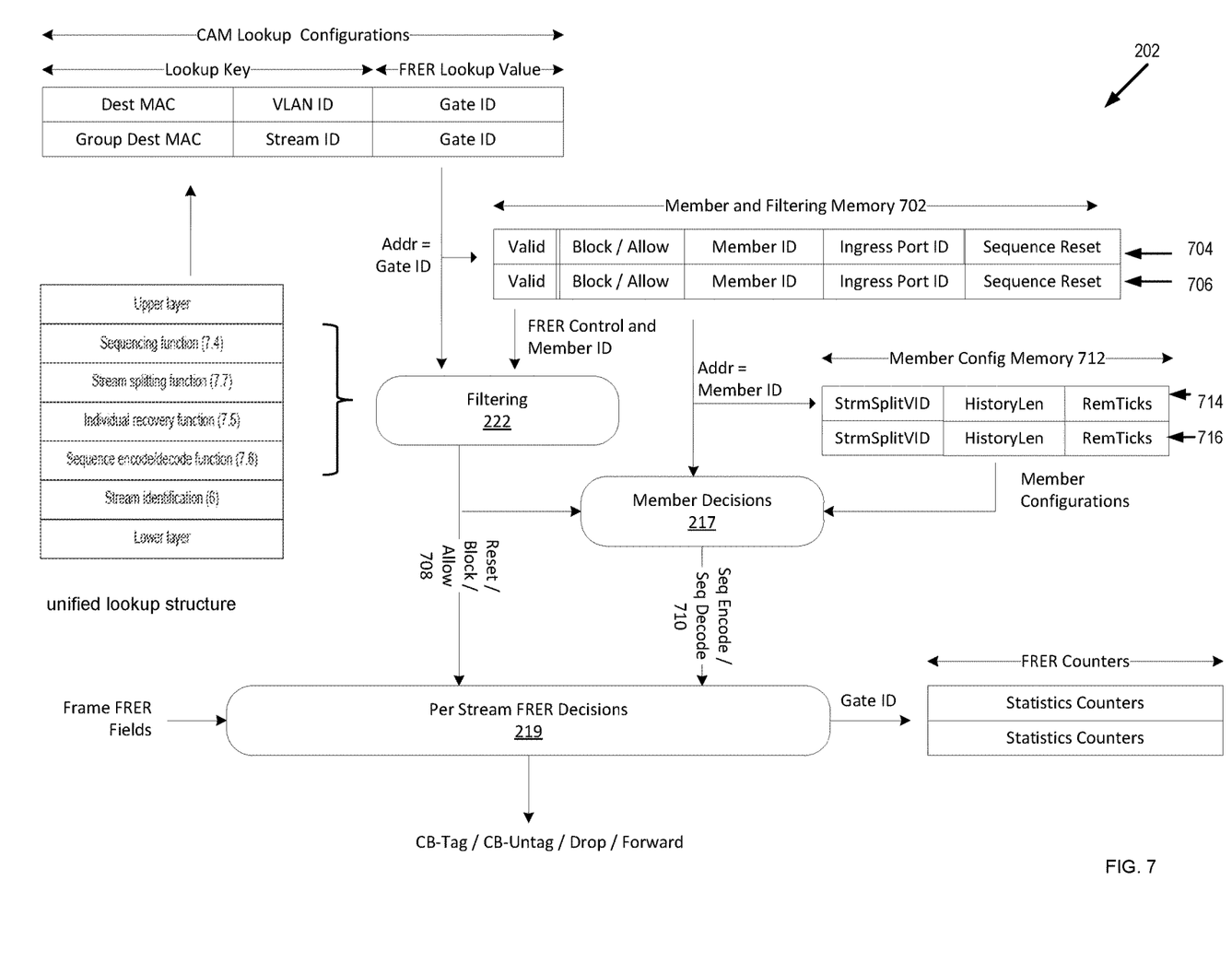
FIG. 7 is a block diagram illustrating filtering, policing, and frame replication and elimination for reliability (FRER) functions of a switch according to some embodiments of the present disclosure.

The method 380 may then proceed to block 386, where the switch performs filtering, metering, and policing on a per stream basis. As shown in the example of FIG. 7, the switch 202 includes a member and filtering configuration memory 702 includes a plurality of member and filtering configurations (e.g., member and filtering configurations 704 and 706). Each of the member and filtering configurations may include various filtering parameters, including for example, filtering actions (e.g., "Block/Allow"), an ingress port ID, and a sequence reset parameter indicating to reset a sequence. The member and filtering configuration may also include various member decision parameters including, for example, a member ID, which may be used to retrieve the corresponding member configuration, and a sequence reset parameter.

In various embodiments, a filtering unit 222 of the traffic policer 218 may receive the frame lookup output 428 including the gate ID from the frame lookup unit 216, and receive the member and filtering configuration (e.g., retrieved from the member and filtering configuration memory 702). The filtering unit 222 may perform filtering to the received frame on a per stream basis. The filtering unit 222 may perform filtering based on filtering rules and the stream filtering parameters. In an example, the filtering unit 222 determines that a frame does not comply with its filtering rules and is invalid, and blocks that invalid frame (e.g., using software configuration). In another example, the filtering unit 222 determines that a frame complies with its filtering rules and is valid, and sends that valid frame to subsequent processes (e.g., metering and policing processes). The filtering unit 222 may generate filtering decisions 708 indicating filtering actions (e.g., reset, block, allow) performed to a particular frame.

In some embodiments, at block 386, the filtering function may be performed based on a switching mode of the switch. The switch 202 may operate under various switching modes, including, for example, a cut-through mode and a store and forward mode. The filtering unit 222 uses the blocking feature under the cut-through mode, where the switch starts forwarding a frame (or packet) before the whole frame has been received, normally as soon as the destination address is processed. On the other hand, under a store and forward mode, a frame (or packet) is kept and sent later to the destination by the switch, and the error frames are discarded by the switch. As such, under the store and forward mode, the blocking feature is optional.

In various embodiments, a blocked stream may be monitored for recovery from errors. The filtering configuration may include a filter parameter for enabling the blocking feature. Such a filter parameter of the filtering configuration may be updated dynamically.

At block 386, the switch 202 may then perform metering and policing to the frames validated by the filtering unit 222 based on metering configurations. In some embodiments, the metering and policing functions may be performed based on metering configurations (e.g., using a two-rate three-color metering algorithm).

The method 380 may proceed to block 388, where member decisions are made. As shown in FIG. 7, the switch 202 may use the member ID in the member and filtering configuration as an address to look up, from a member configuration memory 712, a member configuration (e.g., member configurations 714/716). In some embodiments, in the subsequent FRER process, a sequence recovery action may be performed on a plurality of streams for stream merging. In those embodiments, a member ID may be used to identify a member stream of a sequence, and may be further used to identify gate ID(s) associated with that member stream. The member configuration may include varies member parameters including, for example, history length and remaining ticks, which may be used in a subsequent sequence recovery action in FRER. In some embodiments, for frames to be forwarded to internal endpoint ports, the FRER sequence recovery may also include an untagging action (e.g., untagging of an IEEE 802.1 CB defined tag field of the frame).

In some embodiments, at block 388, the member decisions unit 217 receives the member ID, the member configuration retrieved based on the member ID, and the filtering decisions 708 from the filtering unit 222, and generates member decisions 710. In some embodiments, the member decisions 710 include a sequence function (e.g., sequence encoding, sequence decoding) associated with a sequence including the member stream with the member ID.

The method may then proceed to block 390, where a FRER unit 219 of the switch 202 performs per-stream replication and elimination. For example, the packets of a frame may be replicated and then be sent on two or more disjoint paths. The frame elimination function may then be performed to combine and delete extra packets.

In some embodiments, at block 390, the FRER unit 219 receives, from the frame lookup unit 216, the frame lookup values (e.g., the network port lookup signal 436, internal endpoint port lookup signal 438). The FRER unit 219 may further receive the filtering decisions 708 from the filtering unit 222, receive the member decisions 710 from the member decisions unit 217, and receive frame FRER fields of the received frame (e.g. from a parsing unit 404). The FRER unit 219 may control the network traffic by performing various actions based on the frame lookup values from the frame lookup unit 216, the filtering decisions 708, and the member decisions 710. In some embodiments, the actions include tagging, untagging, stream splitting, individual recovery, sequence recovery, any other suitable actions, and/or a combination thereof provided by the frame lookup values from the frame lookup unit 216. In some embodiments, the actions include a dropping action or a forwarding action from the filtering decisions 708. In some embodiments, the actions include a sequence encode action or a sequence decode action from the member decisions 710.

The method 380 may then proceed to block 392, where a traffic shaper 220 of the switch 202 may perform queuing and transmission selection according to the priority and marking of the frames, and transmit the selected frame through a corresponding egress port of the switch 202. At block 392, a frame may be sent to different queues based on its priority and/or associated gate ID. For example, a frame with a scheduled priority is sent to a scheduled traffic queue. In another example, a frame with a reserved priority is sent to a reserved traffic queue. In yet another example, a frame with a best effort priority is sent to a best effort traffic queue. A transmission selection unit may select a frame from the queues and transmit that selected frame through a corresponding egress port of the switch 202.

It is noted that various configurations (e.g., the number of ports of the switch 202, the frame priorities) illustrated in FIGS. 2 through 7 are exemplary only and not intended to be limiting beyond what is specifically recited in the claims that follow. While examples for an integrated frame lookup and forwarding system are illustrated, a person skilled in the art will recognize that the integrated frame lookup and forwarding system may be extended to other embodiments. In various embodiments, the integrated lookup and forwarding system takes an exhaustive set of considerations (e.g., switch considerations, endpoint considerations) for a particular network (e.g., a TSN network), and provides a flexible lookup and forwarding process for an integrated device (e.g., including both a network device (e.g., a switch) and an internal endpoint). In some embodiments, the integrated lookup and forwarding system includes hardware for accelerations and/or software to have the flexibility to manage the integrated device (e.g., its switch, endpoint, and/or a combination thereof). For example, the integrated lookup and forwarding system may be configured for an IC associated with two network ports and an internal endpoint (e.g., for ring topologies). However, the integrated lookup and forwarding system may be configured for an IC associated with three or more network ports by providing endpoint port actions associated with the endpoint port and network port actions associated with the network ports. For further example, while the exemplary lookup keys include MAC+VLAN ID, the lookup keys may be generated based on IP Octuple, SDNET, or any other suitable lookup key generation methods.

One or more elements in embodiments of the invention may be implemented by software, hardware (e.g., an application specific integrated circuit (ASIC), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. In some examples, for FPGA implementations, the switch 202 may be implemented as logic in FPGA fabric, and an embedded processor and memory may provide the necessary system software. In those examples, integrated components (e.g., ADC, DAC) in an FPGA IC may further assist the various functions including for example the endpoint functions. For TSN solutions, the embodiments described herein improve significantly the cost benefits associated with the integration of TSN components.

When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device, The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A network device in an integrated circuit (IC), comprising:
    a plurality of ports including:
        first and second network ports each configured to connect to a network;
        an internal endpoint port configured to connect to a processing unit of the IC;
    a lookup circuit including a content addressable memory (CAM) configured to:
        provide one or more first actions for a first frame to be forwarded using a first forwarding path between at least a first set of two ports of the plurality of ports, wherein the one or more first actions are determined based on whether the first set of two ports include the internal endpoint port;
        in response to a determination that the one or more first actions include a translation action, provide a translation for the first frame; and
        provide a second action for a second frame to be forwarded using a second forwarding path between at least a second set of two ports of the plurality of ports;
        wherein the CAM is configured using hardware address learning that is selectively enabled based on traffic priority;
    a traffic control circuit configured to:
        forward the first frame based on the one or more first actions and the translation; and
        forward the second frame based on the second action.

2. The network device of claim 1, wherein the internal endpoint port is configured to connect to a memory of the IC through an internal bus of the IC.

3. The network device of claim 1,
    wherein the first forwarding path is between one of the first and second network ports and the internal endpoint port; and
    wherein the second forward path is between the first network port and the second network port.

4. The network device of claim 1, wherein the translation action is for translating a stream identification of the first frame in response to a determination that the first set of two ports include the internal endpoint port.

5. The network device of claim 1, wherein the translation from the lookup circuit is associated with a destination media access control (MAC) address field of the first frame.

6. The network device of claim 1, wherein the translation from the lookup circuit action is associated with a virtual LAN (VLAN) identifier (ID) field of the first frame.

7. The network device of claim 1, wherein a stream identification of the second frame remains the same when the second frame is forwarded using the second forwarding path in response to a determination that the second forwarding path is between at least the first and second network ports.

8. The network device of claim 1, wherein the one or more first actions include a stream split action in response to a determination that the first forwarding path is from the internal endpoint port.

9. The network device of claim 1,
wherein the one or more first actions include at least one of a stream merge action and a sequence recovery action in response to a determination that the first forwarding path is to the internal endpoint port.

10. The network device of claim 1,
wherein the second action includes an individual recovery action in response to a determination that the second forwarding path is between first and second network ports.

11. The network device of claim 1, wherein the lookup circuit includes:
a lookup unit coupled to the CAM and configured to:
generate a lookup key based on a received frame; and
provide a lookup value using the CAM based on the lookup key,
wherein the lookup value includes one of the first and second actions.

12. The network device of claim 1, wherein the traffic control circuit is configured to:
perform a frame replication and elimination for reliability (FRER) unit configured to perform a FRER process for a received frame.

13. A method, comprising:
receiving, by a network device having a plurality of ports, a first frame and a second frame,
wherein the plurality of ports include:
first and second network ports each configured to connect to a network; and
an internal endpoint port configured to connect to a processing unit;
providing, by a lookup circuit including a content addressable memory (CAM), one or more first actions for the first frame to be forwarded using a first forwarding path between at least a first set of two ports of the plurality of ports based on whether the first set of two ports include the internal endpoint port;
wherein the CAM is configured using hardware address learning that is selectively enabled based on traffic priority;
in response to a determination that the one or more first actions include a translation action, providing, by the lookup circuit, a translation for the first frame;
providing a second action for the second frame to be forwarded using a second forwarding path between a second set of two ports of the plurality of ports;
forwarding the first frame based on the one or more first actions and translation; and
forwarding the second frame based on the second action.

14. The method of claim 13,
wherein the first forwarding path is between one of the first and second network ports and the internal endpoint port; and
wherein the second forward path is between the first network port and the second network port.

15. The method of claim 13, wherein the translation action is for translating a stream identification of the first frame in response to a determination that the first set of two ports include the internal endpoint port.

16. The method of claim 13, wherein the translation is associated with at least one of a destination media access control (MAC) address field and a virtual LAN (VLAN) identifier (ID) field of the first frame.

17. The method of claim 13, wherein a stream identification of the second frame remains the same when the second frame is forwarded using the second forwarding path in response to a determination that the second forwarding path is between first and second network ports.

18. The method of claim 13,
wherein the one or more first actions include a stream split action in response to a determination that the first forwarding path is from the internal endpoint port.

19. The method of claim 13,
wherein the one or more first actions include at least one of a stream merge action and a sequence recovery action in response to a determination that the first forwarding path is to the internal endpoint port.

20. The method of claim 13,
wherein the second action includes an individual recovery action in response to a determination that the second forwarding path is between first and second network ports.

* * * * *